A. PFEIFFER.
TAP AND FAUCET.
No. 184,796. Patented Nov. 28, 1876.
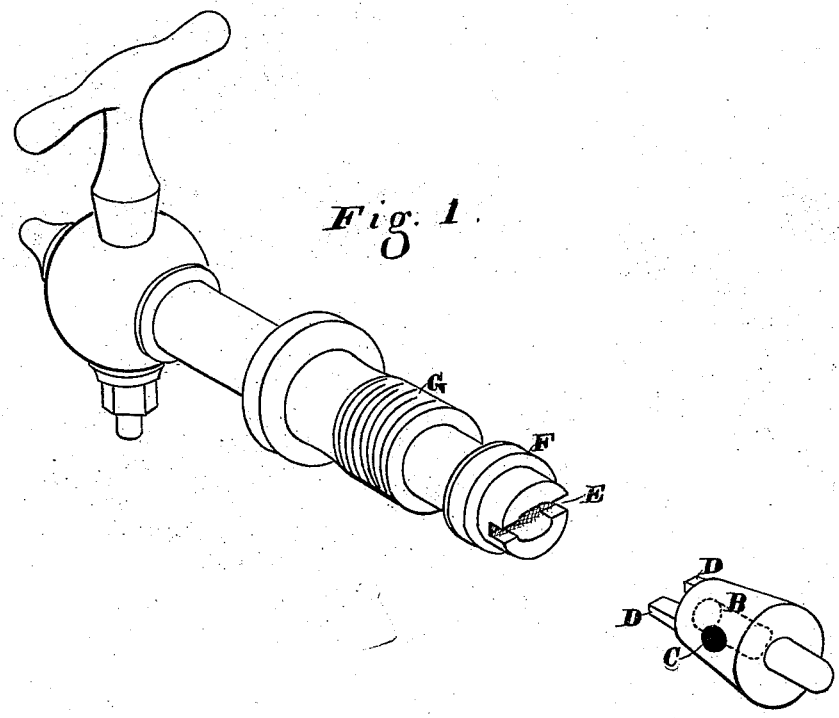
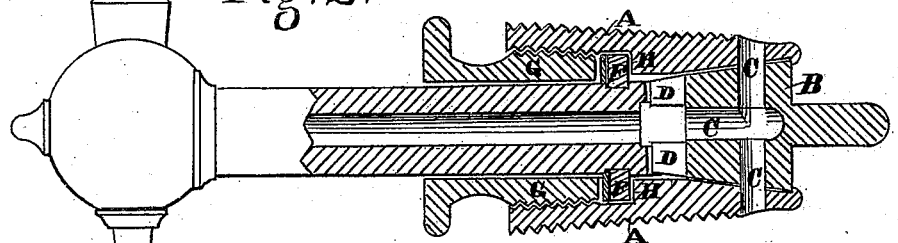
Witnesses
Geo. H. Strong.
Olwyn T. Stacy.
Inventor
Antone Pfeiffer
By his Attys
Dewey & Co.

UNITED STATES PATENT OFFICE.

ANTONE PFEIFFER, OF SAN FRANCISCO, CALIFORNIA.

IMPROVEMENT IN TAPS AND FAUCETS.

Specification forming part of Letters Patent No. 184,796, dated November 28, 1876; application filed October 17, 1876.

*To all whom it may concern:*

Be it known that I, ANTONE PFEIFFER, of the city and county of San Francisco, and State of California, have invented an Improved Tap and Faucet; and I do hereby declare the following to be a full, clear, and exact description thereof, reference being had to the accompanying drawings.

My invention relates to certain improvements in that class of faucet-taps which are intended to be permanently secured in the head of the barrel, and are provided with a valve which is opened by the aid of the faucet introduced to the tap, and through which the liquid is to be drawn.

These taps, as usually constructed, have various forms of valves, most of which have screw-threads upon the outside, so that after the faucet has been screwed in part way it will take hold of the valve and open it (either by screwing it inward or outward) by the time the faucet has reached its seat, while the latter must be carefully protected from leakage by closely-fitting packing.

My invention consists in the employment of a tapering plug ground to fit the inner end of the tap, with its large end toward the interior of the barrel, while its small end is provided with a lug or lugs, which fit into a slot made transversely in the end of the faucet.

The faucet is pushed directly to its place and is secured by a gland surrounding it, and screwed into the tap, making a tight joint, by pressing an elastic washer against a seat or shoulder within the tap. Holes are made in the plug, and in the sides of the tap, and when the faucet is turned a little it opens a passage in the manner of an ordinary faucet.

Referring to the accompanying drawings for a more complete explanation of my invention, Figure 1 is a perspective view of my faucet and valve. Fig. 2 is a section of the same.

A is my tap, which consists of a hollow frustum of a cone, having screw-threads upon its outside, by which to screw it permanently into a barrel. The opening at the end which projects into the barrel is made conical, its greatest diameter being inward, and a tapering plug, B, is ground to fit this opening in the same manner as the plug of an ordinary faucet, and holes C made transversely through the plug and the sides of the tap admit the liquid from the barrel to the interior of the tap, when the plug is turned until the holes coincide. As the large end of the plug is toward the interior of the barrel, the pressure of the liquid or the gases contained tends to hold the plug to its seat, and prevent leakage; but it is retained from accidental loss by turning the edge of the tap over by a tool, so as to retain the plug in place, as shown. The inner and smaller end of the plug has two lugs, D, projecting from it, and the corresponding end of the faucet has a slot, E, made transversely across it, so that when the faucet is pushed into the tap the slot will fit over these lugs. The barrel of this faucet is turned perfectly plain, with no screw-threads at all, and having a groove turned near its inner end to receive an elastic ring or washer, F. Around the barrel of the faucet is a gland, G, which has a screw-thread cut upon its outside, so as to fit a corresponding thread cut on the interior of the tap.

The tap being in place in the barrel the faucet is simply pushed in until the slot E and lugs D engage, and the tap will preferably stand so that the faucet-plug proper will stand at an angle when the inner valve is closed, and will stand vertically when it is opened. The faucet is then secured in the tap by simply serewing in the gland until it presses upon the elastic ring F, which is forced closely against a shoulder or seat, H, formed within the tap. It will then be only necessary to turn the barrel of the faucet a little in one direction to open the valve B, and again a little more to close it. It will be seen that no screw or spring is needed to hold the plug to its place, and no combination of right and left hand screws to open or close the valve.

The thickness of the elastic ring or washer is immaterial to the operation of the faucet and valve, or to keeping a tight joint, which is very easily done, and the whole device is efficient, durable, and inexpensive.

I am aware that a faucet has been made having a plug fitting into a tubular socket, which in turn screwed into the barrel, but this plug was operated by means of a sleeve which screwed upon the plug, and was provided with an exterior handle by which it was turned. I do not therefore claim, broadly, a valve consisting of a plug fitting the interior end of the tap; but What I do claim as new, and desire to secure by Letters Patent, is—

The tap A, having the plug B secured in it, as shown, with its large end toward the interior of the barrel, and having its small end provided with the lugs D, in combination with the faucet, slotted at E, and provided with the elastic ring F, said faucet being secured to the tap by means of the gland G, substantially as herein described.

In witness whereof I have hereunto set my hand and seal.

ANTONE PFEIFFER. [L. S.]

Witnesses:
GEO. H. STRONG,
FRANK A. BROOKS.